United States Patent
Chen

(10) Patent No.: US 9,794,955 B2
(45) Date of Patent: Oct. 17, 2017

(54) CONFIGURATION OF CSI-RS FOR COMP FEEDBACK

(75) Inventor: Runhua Chen, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 72 days.

(21) Appl. No.: 13/586,306

(22) Filed: Aug. 15, 2012

(65) Prior Publication Data

US 2013/0044707 A1 Feb. 21, 2013

Related U.S. Application Data

(60) Provisional application No. 61/525,325, filed on Aug. 19, 2011, provisional application No. 61/523,543, filed on Aug. 15, 2011.

(51) Int. Cl.
*H04W 72/12* (2009.01)

(52) U.S. Cl.
CPC .............. *H04W 72/1231* (2013.01)

(58) Field of Classification Search
CPC .............. H04W 52/02; H04W 56/00
USPC .............. 370/331, 503, 252, 328, 329, 255; 455/502
See application file for complete search history.

(56) References Cited

U.S. PATENT DOCUMENTS

| | | | |
|---|---|---|---|
| 2012/0176939 A1* | 7/2012 | Qu et al. | 370/255 |
| 2012/0281556 A1* | 11/2012 | Sayana et al. | 370/252 |
| 2012/0320847 A1* | 12/2012 | Nam et al. | 370/329 |
| 2013/0003668 A1* | 1/2013 | Xiao et al. | 370/329 |
| 2013/0028120 A1* | 1/2013 | Sun et al. | 370/252 |
| 2013/0028182 A1* | 1/2013 | Geirhofer et al. | 370/328 |
| 2013/0029657 A1* | 1/2013 | Gao et al. | 455/422.1 |
| 2013/0034064 A1* | 2/2013 | Nam et al. | 370/329 |
| 2013/0039199 A1* | 2/2013 | Liao et al. | 370/252 |
| 2013/0265981 A1* | 10/2013 | Yang et al. | 370/329 |
| 2013/0279361 A1* | 10/2013 | Seo et al. | 370/252 |

* cited by examiner

*Primary Examiner* — Albert T Chou
(74) *Attorney, Agent, or Firm* — Ronald O. Neerings; Charles A. Brill; Frank D. Cimino

(57) ABSTRACT

This invention is a manner of Coordinated Multi-Point (CoMP) transmission between with plural base stations and at least one user equipment. The user equipment measures channel state information of plural base stations using plural CSI-RS resources based on the nodes to which that user equipment can communicate. Generally the identity of these nodes is signaled to the user equipment by one of the base stations. The user equipment calculates a channel state information for each of the base stations and transmits a corresponding channel state indicator response. A higher-layer signaling from at least one base station to the user equipment configures the CSI-RS sequence for each of plural CSI-RS resources. One base station determines communications parameters for communication with the user equipment and plural base stations and signals the user equipment. The user equipment establishes communication with the plural base stations via the determined communication parameters.

42 Claims, 6 Drawing Sheets

CONFIGURATION OF CSI-RS FOR COMP FEEDBACK

CLAIM OF PRIORITY

This application claims priority under 35 U.S.C. 119(e)(1) to U.S. Provisional Application No. 61/523,543 filed Aug. 15, 2011 and to U.S. Provisional Application No. 61/525,325 filed Aug. 19, 2011.

TECHNICAL FIELD OF THE INVENTION

The technical field of this invention is wireless communication such as wireless telephony.

BACKGROUND OF THE INVENTION

The present embodiments relate to wireless communication systems and, more particularly, to Coordinated Multi-Point (CoMP) transmission in which a single mobile unit communicates with plural base stations.

In legacy wireless cellular systems such as LTE Rel. 8 to 10, a wireless network includes multiple base stations. Each base station may be configured as a single cell with their own cell ID. A mobile terminal or user equipment (UE) is always synchronized to and communicates Uplink (UL) and Downlink (DL) data with the connected cell with single-cell transmission/reception.

Channel station information reference symbol (CSI-RS) is used in LTE Rel. 10 for UE CSI feedback purpose. A UE measures the downlink channel from an eNB transmitter to the UE receiver using CSI-RS and reports Channel State Information (CSI) measurement in the uplink. CSI-RS is UE-specific and unprecoded. CSI-RS configuration in LTE Rel. 10 is based on the single-cell framework. The following parameters for CSI-RS are explicitly configured via semi-static radio resource control (RRC) higher-layer signaling for each UE, including the following parameters Nt, Ni, Np, Noffset and α. Nt is the number of CSI-RS antenna ports. In LTE Rel. 10 the number of antenna ports can be ', 2, 4 or 8. Ni is the CSI-RS pattern index corresponding to a certain CSI-RS pattern, based on the number of CSI-RS antenna ports. Np is the duty cycle or periodicity of CSI-RS transmission. For Np=5 the CSI-RS is transmitted every 5 subframes. In LTE each subframe is 1 ms in duration. Noffset is the subframe offset. The duty cycle and subframe offset are jointly encoded in LTE Rel. 10 and signaled to a UE via the downlink subframes that contain CSI-RS. The parameter α is used to control UE assumption on reference PDSCH transmitted power for CSI feedback.

Tables 1 and 2 below list examples of these quantities.

TABLE 1

| Parameters | Values |
| --- | --- |
| Number of CSI-RS Antenna Ports | 2, 4, 8 |
| Intra-subframe location index | 32/16/8 patterns for 2/4/8 CSI-RS ports |

TABLE 2

| $I_{cycle,\ subframe\ offset}$ | Duty cycle | Subframe offset |
| --- | --- | --- |
| $I_{cycle,\ subframe\ offset} \leq 4$ | 5 | $I_{cycle,\ subframe\ offset}$ |
| $5 \leq I_{cycle,\ subframe\ offset} \leq 14$ | 10 | $I_{cycle,\ subframe\ offset} - 5$ |
| $15 \leq I_{cycle,\ subframe\ offset} \leq 34$ | 20 | $I_{cycle,\ subframe\ offset} - 15$ |
| $35 \leq I_{cycle,\ subframe\ offset} \leq 74$ | 40 | $I_{cycle,\ subframe\ offset} - 35$ |
| $74 \leq I_{cycle,\ subframe\ offset} \leq 154$ | 80 | $I_{cycle,\ subframe\ offset} - 75$ |

The CSI-RS sequence mapped to each CSI-RS pattern in a cell is generated by a pseudo-random sequence generator as a function of the cell ID in the cell.

In Rel. 10 the cell ID is not explicitly signaled by the eNB but is implicitly derived by the UE as a function of the primary synchronization signal (PSS) and secondary synchronization signal (SSS). To connect to a wireless network, the UE performs downlink cell search to synchronize to the strongest cell. Cell search is performed by blindly detecting the PSS/SSS of each cell and comparing the receive power strength of different cells. After cell search is successfully performed, the UE establishes connection to the strongest cell and derives the cell ID from the PSS/SSS.

SUMMARY OF THE INVENTION

This invention is a manner of Coordinated Multi-Point (CoMP) transmission between with plural base stations and at least one user equipment. The user equipment measures downlink channel of plural base stations using plural CSI-RS resources and feeds back the channel state information (CSI) of plural base stations in the uplink. Each CSI-RS resource is configured by the network to be associated to one base station. The CSI feedback of plural base stations are subsequently utilized by the network to performance downlink scheduling, determining CoMP coordination schemes, performing intercell interference coordination and calculating time, frequency and spatial scheduling assignment for the UE. This is generally based upon the nodes to which that user equipment can communicate. Generally the identity of these nodes is signaled to the user equipment by one of the base stations. The user equipment calculates a channel state information on the associated CSI-RS resource and transmits a channel state information response for each base station. One base station determines communications parameters for communication with the user equipment and plural base stations and signals the user equipment. The user equipment establishes communication with the plural base stations via the determined communication parameters.

The channel to be measured by the user equipment can be signaled in several ways. One base station may signal which plural CSI-RS resources to use by configuring a plurality of configurations of CSI-RS resources via a higher layer and determining which of the plural CSI-RS resources dependent upon the received indication of cell ID. This cell ID may be signaled via a higher layer or via primary synchronization signal (PSS) and secondary synchronization signal (SSS). The measurement set may be predetermined and which of the plural configurations of CSI-RS resources dependent upon cell ID. The base station may transmit a cell ID configuration message via a higher layer. The cell ID configuration message then determines which technique is used to determine the CSI-RS resources measured by the user equipment. The configured cell-ID is not necessarily the same as the actual cell ID of the cell that the UE is synchronized to, but is a virtual cell ID used by the UE to derive the CSI-RS sequence used for CSI-RS resources.

BRIEF DESCRIPTION OF THE DRAWINGS

These and other aspects of this invention are illustrated in the drawings, in which:

FIG. 6 illustrates the Channel State Information (CSI) Resource signal (RS) antenna patterns for 2, 4 and 8 antenna ports in one physical resource block (PRB) for an extended cyclic prefix subframe.

DETAILED DESCRIPTION OF PREFERRED EMBODIMENTS

Figure 1:
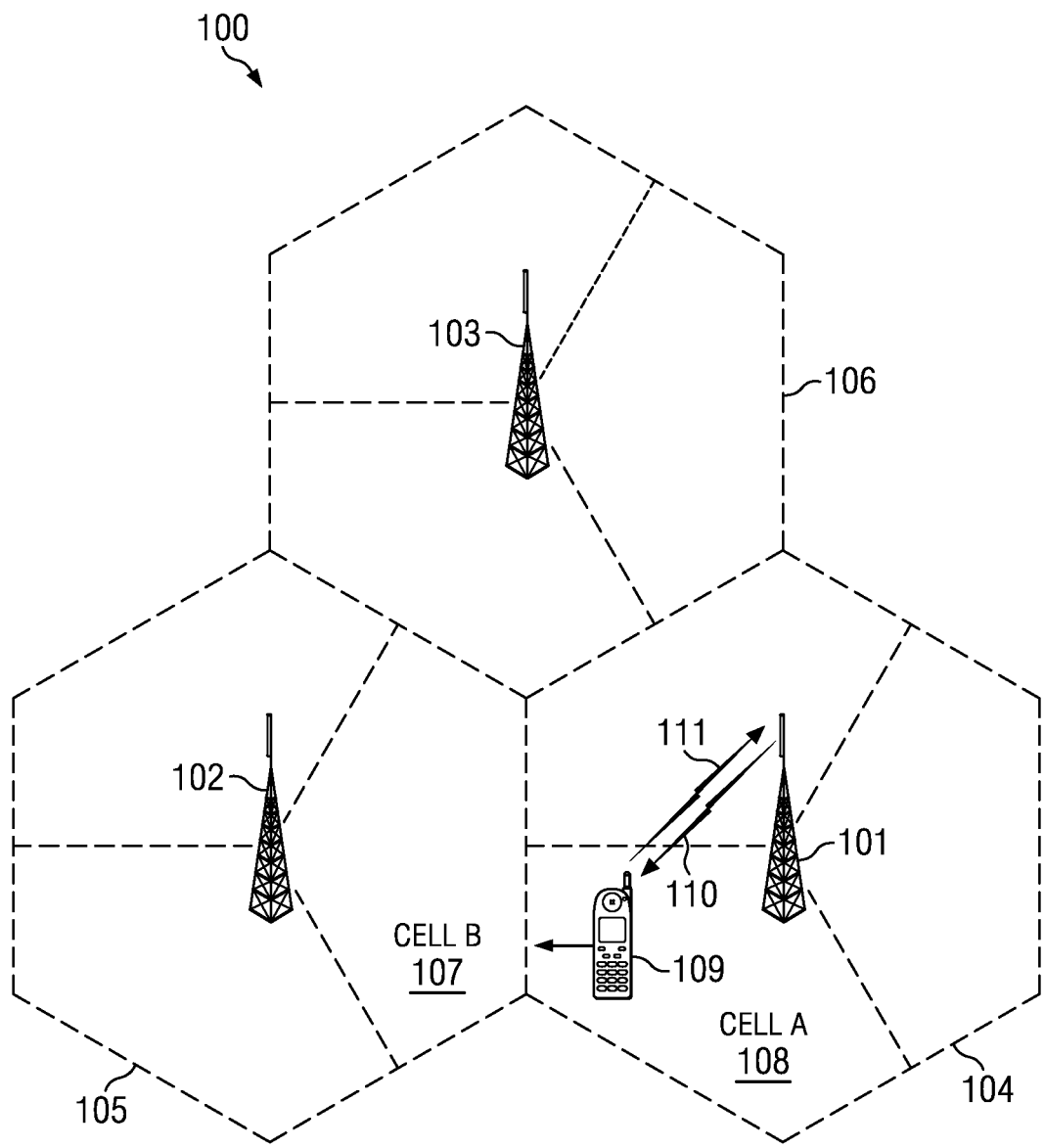
FIG. 1 illustrates an exemplary prior art wireless communication system to which this application is applicable.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 (eNB) are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UEs data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Base station 101 configures UE 109 for periodic uplink sounding reference signal (SRS) transmission. Base station 101 estimates uplink channel state information (CSI) from the SRS transmission.

Figure 2:
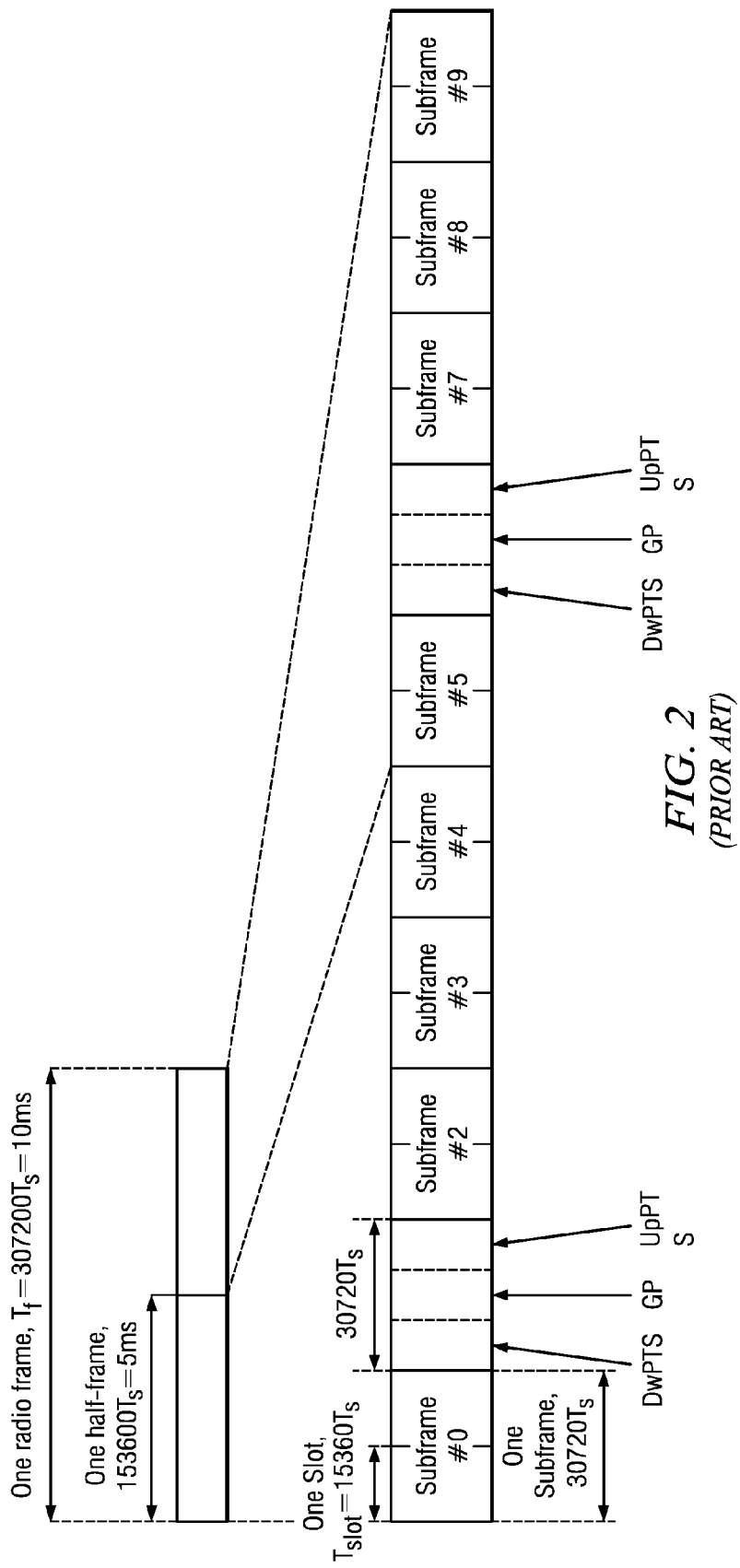
FIG. 2 shows the Evolved Universal Terrestrial Radio Access (E-UTRA) Time Division Duplex (TDD) frame structure of the prior art.

FIG. 2 shows the Evolved Universal Terrestrial Radio Access (E-UTRA) time division duplex (TDD) Frame Structure. Different subframes are allocated for downlink (DL) or uplink (UL) transmissions. Table 3 shows applicable DL/UL subframe allocations.

TABLE 3

| Config-uration | Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

CoMP Measurement and Feedback with CSI-RS

CoMP stands for Coordinated Multi-Point Transmission, where multiple transmission points (TP) such as cell, macro eNB, pico eNB femto eNB, or remote radio heads (RRH), distributed antennas, other wireless transmission entity, or a combination of these coordinate with each other to jointly optimize the downlink beamforming signals. A pico eNB is a low power base station having a smaller cell size for a more limited local coverage than a macro eNB. A femto eNB has an even further limited local coverage, generally in the range of 10 meters. A remote radio head (RRH) is an antenna located remotely from the base station handling the same transmitted or received signal as the base station. The RRH is coupled to the eNB via a non-air transmission link such as a wired radio frequency (RF) link or a fiber optic link. The eNB performs the baseband processing for all RRHs. In contrast to traditional wireless networks without cell coordination where signals from other transmission points impose co-channel interference, coordination within multiple TPs allows the signals to be cooperatively designed to reduce co-channel interference. This boosts the received signal to noise ratio (SNR) and improves cell-average throughput and cell-edge coverage at the UE.

Figure 3:
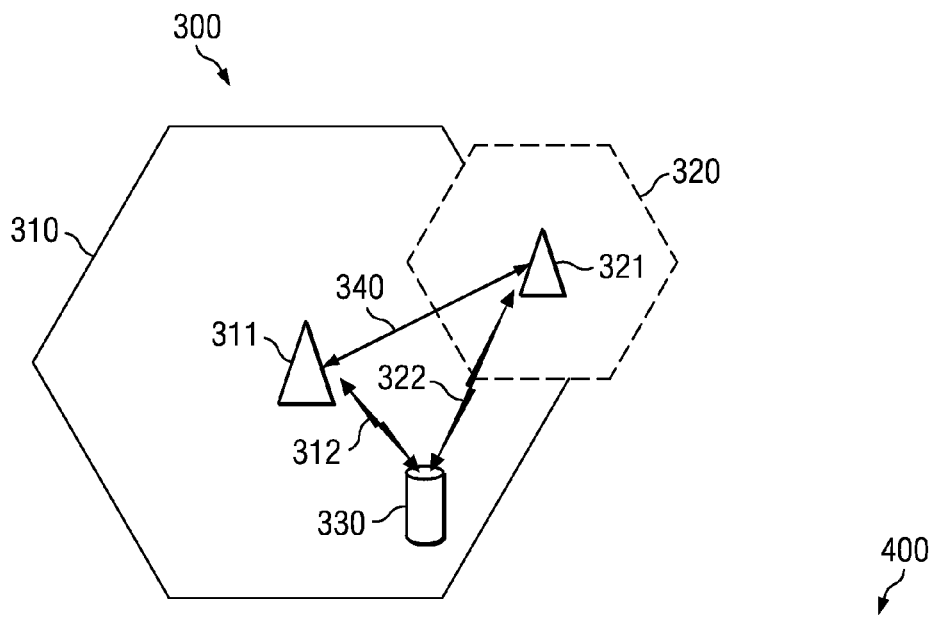
FIG. 3 illustrates an example Coordinated Multi-Point scenario.

FIG. 3 illustrates an example CoMP scenario 300. Cell 310 includes main base station (eNB) 311. Subsidiary cell 320 includes subsidiary base station (eNB) 321. User equipment (UE) 330 communicates with both base stations. Main eNB 311 communicates with UE 330 via two-way radio frequency link 312. Subsidiary eNB 321 communicates with UE 330 via two-way radio frequency link 322. FIG. 3 illustrates UE 330 within cell 310 and not within cell 320, but this is only an example. UE 330 may be located only 330 within cell 320 and not within cell 310 or within both cells 310 and 320. The two eNBs 311 and 321 must generally communicate via a backhaul network 340.

In conventional single-cell communication, all downlink signals transmitted from a cell are dependent on the cell ID. The pseudo-random sequence generator for the CSI-RS of each cell is initialized by a parameter $C_{init}$ which is a function of cell ID of the corresponding cell. The CSI-RS sequence is a function of the cell ID of the cell that the UE is synchronized to. Associating downlink signal to the cell ID randomizes intercell interference and is beneficial in single cell communication. For CoMP multi-cell communication, a UE needs to measure the downlink channel state information of multiple cells by measuring on multiple CSI-RS resources. Because the multiple base stations may correspond to different cells with different cell IDs, a mechanism is needed to inform the UE the CSI-RS sequence of the multiple CSI-RS resources so that CSI measurement can be performed. This cannot be achieved by conventional mechanism because UE only knows the cell ID of one strongest cell, but not all cells involved in CoMP coordinated.

Figure 4:
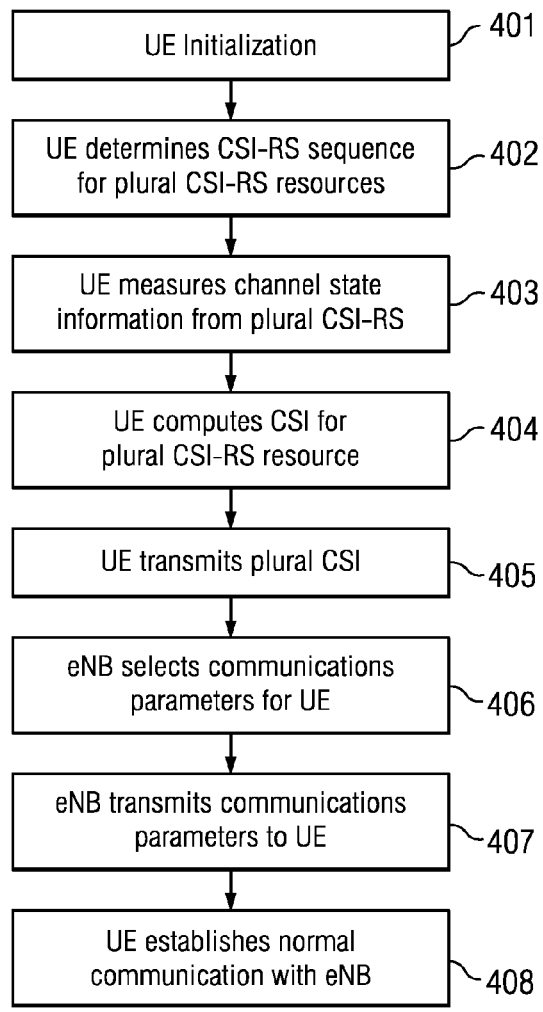
FIG. 4 illustrates the typical steps of initialization of a user equipment which includes this invention.

FIG. 4 illustrates the process 400 of the UE initiating communication. At block 401 the UE begins its initialization. This could occur by the UE powering up from an OFF state or the UE first coming within range of the corresponding eNB. The UE performs cell search, connects to one strongest cell and obtains its cell ID. In the known art the cell ID can be determined from primary synchronization signal (PSS) and secondary synchronization signal (SSS) of the strongest cell. These are continuously or periodically transmitted. The network subsequently configures the UE with CoMP communication where the UE not only communicates with the strongest cell but with another cell or cells. This requires the UE to measure the multiple CSI-RS resources of multiple cells. At this stage the UE does know the CSI-RS sequence of other cells, because the UE does not know the cell IDs of the other cells involved in CoMP coordination. At block 402 the CSI-RS sequence for the CSI-RS resources of each cell in CoMP coordination is configured by higher-layer signaling to the UE. This higher-layer signaling could be transmitted to the UE by the strongest cell to which the UE is synchronized. Upon determination of the sequences for multiple CSI-RS resources, in block 403 the UE measures channel state information on the CSI-RS resource from each eNB. In a CoMP scenario there are plural such eNBs, each with its own CSI-RS resource. At least one of the communicating eNBs signals the UE which CSI-RS resources to measure. In block 404 the UE uses plural CSI-RS resources to compute a Channel State Information (CSI) for each of the plural eNBs. In block 405 the UE transmits these CSI measurements. The UE does not control which eNB receives this signal. The UE transmits this signal and one or more eNBs receive it.

In block 406 a eNB selects communication parameters for the UE to use in normal communications. These communications parameters may have the UE exchanging UL and DL signals with one or more of the plural eNBs. The eNB bases this selection on the plural CSI responses from the UE (block 405). In block 407 the communicating eNB(s) transmit information that the UE needs to cooperate with the set of eNBs. In block 408 the UE establishes normal communications in accordance with these communication parameters.

For CoMP the UE feedback (blocks 404 and 405) needs to contain multiple CSI measurements corresponding to multiple transmission points. In order to do this higher layer signaling configures multiple CSI-RS resources. Each CSI-RS resource corresponds to a unique single cell CSI-RS pattern. The linkage between each configured CSI-RS resource and each transmission point is configured at the eNB and can be transparent to the UE. The UE measures on the CSI-RS of each CSI-RS resource and reports the corresponding CSI. Thus the UE makes measurement on plural CSI-RS resources for this feedback operation.

The multiple transmission points involved in CoMP transmission can be configured as a single cell with one cell-ID or multiple cells with multiple cell-IDs. These are defined as single-cell ID CoMP and multi-cell-ID CoMP.

For CoMP with multiple cell IDs the UE needs to know the cell IDs of all transmission points in the CoMP measurement set in order to perform CSI-RS measurement. In LTE Rel. 10 standard the UE only knows the cell ID of the serving cell. This invention includes the following embodiments.

In a first embodiment the eNB higher layer configures multiple CSI-RS resources. For the k-th CSI-RS resource (k=1, . . . K) the eNB higher layer configures a cell ID denoted by CID(k) and addition parameters such as the number CSI-RS antenna ports, the CSI-RS pattern index, the duty cycle, the subframe offset and the CSI-RS power. For the k-th CSI-RS resource, the UE assumes that CSI-RS sequence is derived using CID(k). A total of K CID values are configured by a higher layer, where K is the number of CSI-RS resources or the number of CSI feedback for CoMP.

In a second embodiment the eNB higher layer configures K multiple CSI-RS resources. The eNB higher layer configures one cell ID denoted by CID. For each of the K CSI-RS measurement sets, the UE assumes that CSI-RS sequence is derived with the CID. In one alternative, the CID is equivalent to the serving cell ID derived from a Primary Synchronization Signal (PSS) or a Secondary Synchronization Signal (SSS). In a second alternative, the CID can be different from the serving cell ID derived from PSS/SSS. One example of this includes distributed antennas, where downlink data transmission is sent from a remote radio head (RRH) but not the macro base station to which the UE synchronizes.

In a third embodiment, the higher layer signaling contains no information regarding the CID used for CSI-RS sequence generation for the configured CSI-RS measurement sets. In this embodiment the UE assumes that CSI-RS sequence for the configured CSI-RS measurement sets is generated with the cell ID obtained from the PSS/SSS in the synchronization procedure. This is the cell ID of the serving cell.

In a fourth embodiment, the higher layer uses a combination of the prior three embodiments. The eNB higher layer configures multiple CSI-RS resources. The higher layer signaling indicates a CSI-RS resource Cell ID configuration message. The Cell ID configuration message indicates which of the previous three embodiments is used to obtain the cell ID for CSI-RS sequence generation.

In all of these embodiments, rather than configuring the CELL ID associated with each CSI-RS resource, the CSI-RS base sequence and scrambling for each CSI-RS resource in the RRC higher layer signaling is explicitly signaled.

Figure 5A:
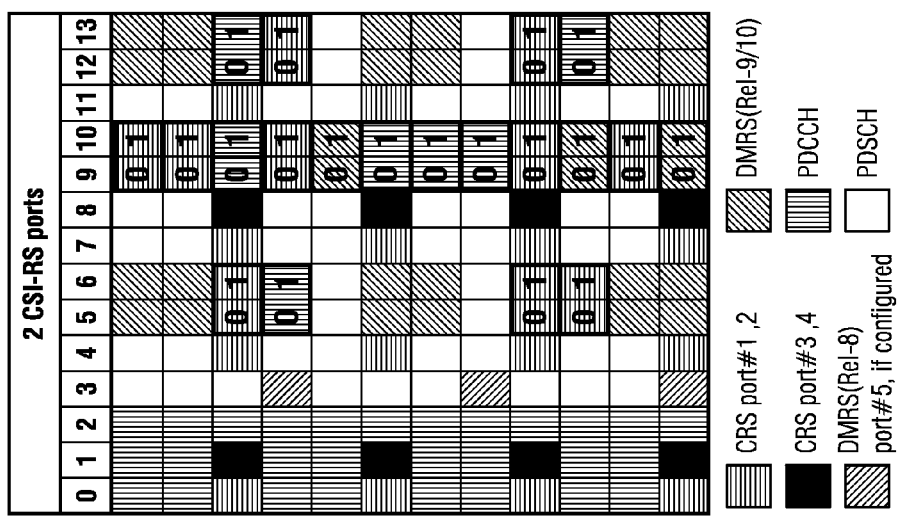
FIG. 5 illustrates the Channel State Information (CSI) Resource signal (RS) antenna patterns for 2, 4 and 8 antenna ports in one physical resource block (PRB) for a normal cyclic prefix subframe.
Figure 5B:
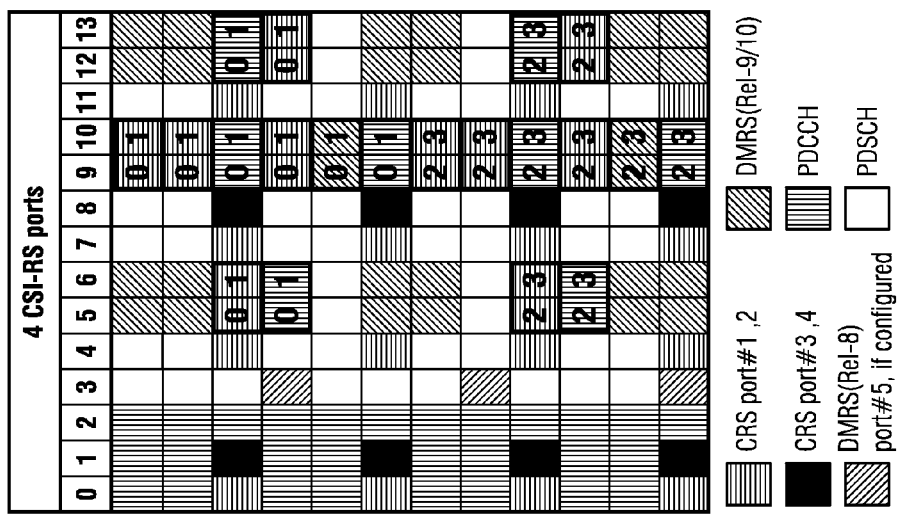
Figure 5C:
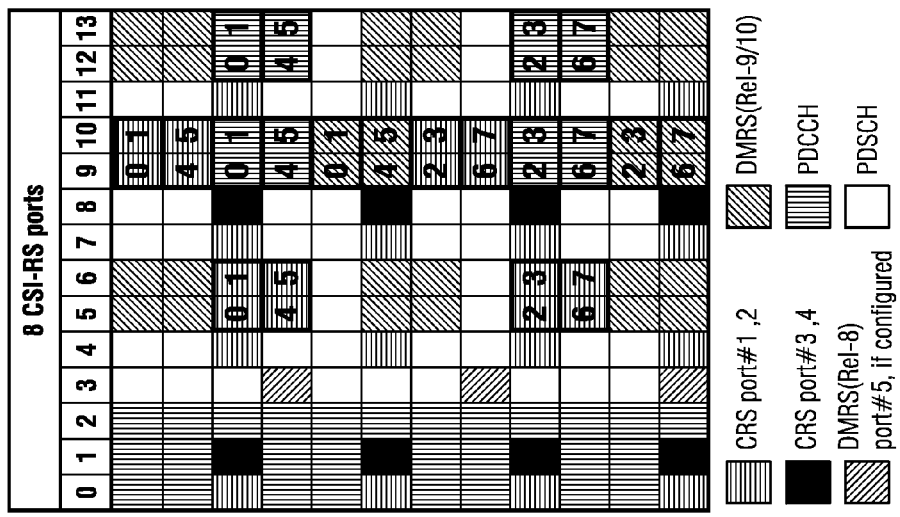

FIGS. 5a, 5b and 5c illustrate the CSI-RS patterns for 2, 4 and 8 CSI-RS antenna ports in one physical resource block (PRB) for a normal cyclic prefix subframe. In each of FIGS. 5a, 5b and 5c the vertical dimension are frequency subcarrier indices and the horizontal dimension are Orthogonal Frequency Division Multiplexing (OFDM) symbol indices. FIGS. 5a, 5b and 5c illustrate various downlink signals including: Cell-specific Reference Signal (CRS) ports 1 and 2; CRS ports 3 and 4; LTE Rel. 8 Demodulating Reference Signals (DMRS) CRS port 5, if configured; LTE Rel. 9 and 10 Demodulating Reference Signals (DMRS); Physical Downlink Control Channel (PDCCH); and Physical Downlink Shared Channel (PDSCH). FIG. 5a illustrates blocks marked "0" allocated to the first CSI-RS antenna port and blocks marked "1" allocated to the second CSI-RS antenna port. FIG. 5b illustrates blocks marked "0" allocated to the first CSI-RS antenna port, blocks marked "1" allocated to the second CSI-RS antenna port, blocks marked "2" allocated to the third CSI-RS antenna port and blocks marked "3" allocated to the fourth CSI-RS antenna port. FIG. 5c illustrates blocks marked "0" allocated to the first CSI-RS antenna port, blocks marked "1" allocated to the second CSI-RS antenna port, blocks marked "2" allocated to the third CSI-RS antenna port, blocks marked "3" allocated to the fourth CSI-RS antenna port, blocks marked "4" allocated to the fifth CSI-RS antenna port, blocks marked "5" allocated to the sixth CSI-RS antenna port, blocks marked "6" allocated to the seventh CSI-RS antenna port and blocks marked "7" allocated to the eighth CSI-RS antenna port.

Figures 6A, 6B, 6C:
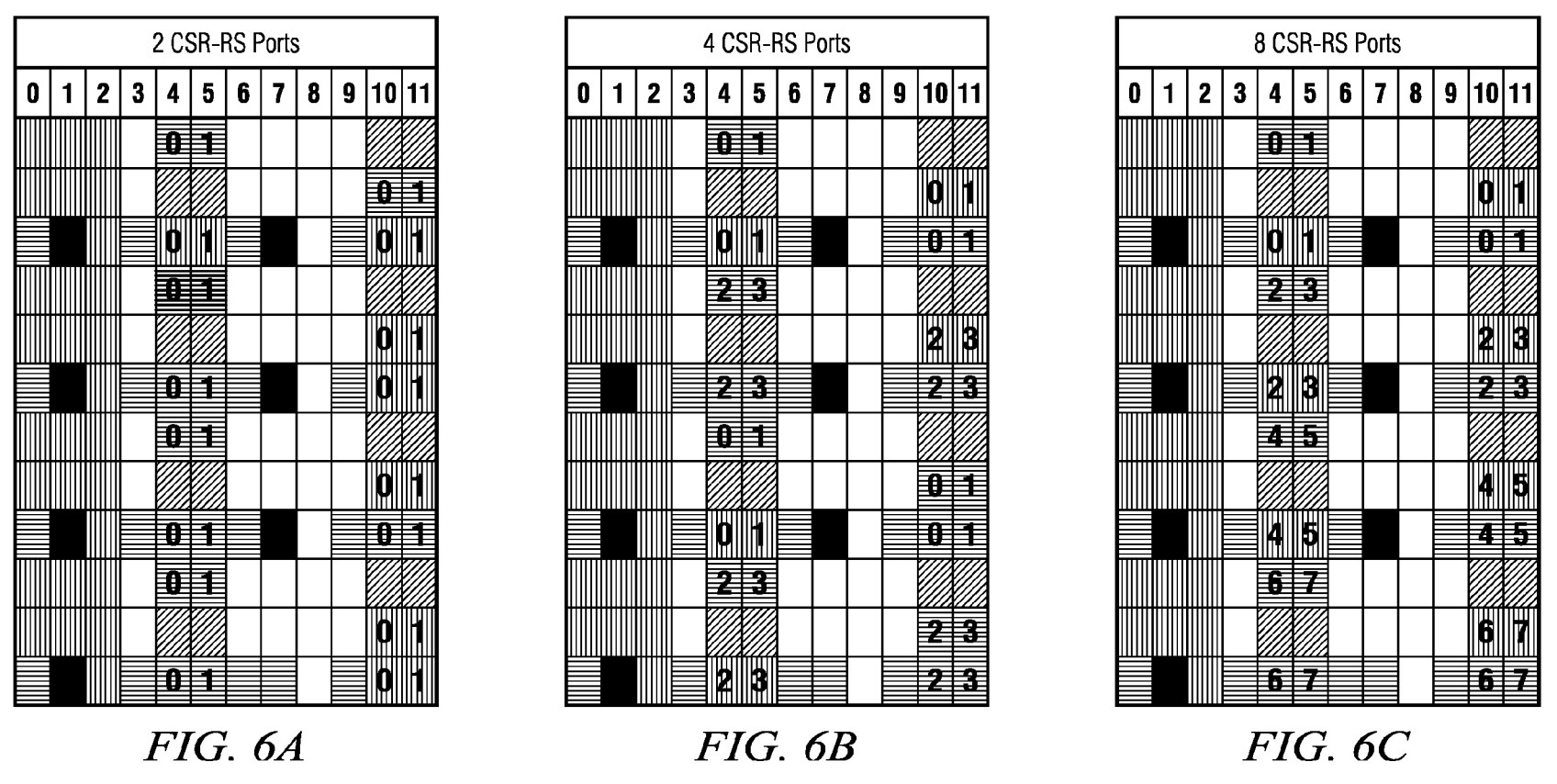

FIGS. 6a, 6b and 6c illustrate the CSI-RS patterns for 2, 4 and 8 CSI-RS antenna ports for an extended cyclic prefix subframe. In each of FIGS. 6a, 6b and 6c the vertical dimension are frequency subcarrier indices and the horizontal dimension are OFDM indices. FIGS. 6a, 6b and 6c illustrate various downlink signals including: CRS ports 1 and 2; CRS ports 3 and 4; LTE Rel. 8 Demodulating Reference Signals (DMRS) port 5, if configured; LTE Rel. 9 and 10 Demodulating Reference Signals (DMRS); Physical Downlink Control CHannel (PDCCH); and Physical Downlink Shared Channel (PDSCH). FIG. 6a illustrates blocks marked "0" allocated to the first CSI-RS antenna port and blocks marked "1" allocated to the second CSI-RS antenna port. FIG. 6b illustrates blocks marked "0" allocated to the first CSI-RS antenna port, blocks marked "1" allocated to the second CSI-RS antenna port, blocks marked "2" allocated to the third CSI-RS antenna port and blocks marked "3" allocated to the fourth CSI-RS antenna port. FIG. 6c illustrates blocks marked "0" allocated to the first CSI-RS antenna port, blocks marked "1" allocated to the second CSI-RS antenna port, blocks marked "2" allocated to the third CSI-RS antenna port, blocks marked "3" allocated to the fourth CSI-RS antenna port, blocks marked "4" allocated to the fifth CSI-RS antenna port, blocks marked "5" allocated to the sixth CSI-RS antenna port, blocks marked "6" allocated to the seventh CSI-RS antenna port and blocks marked "7" allocates to the eighth CSI-RS antenna port.

Figure 7:
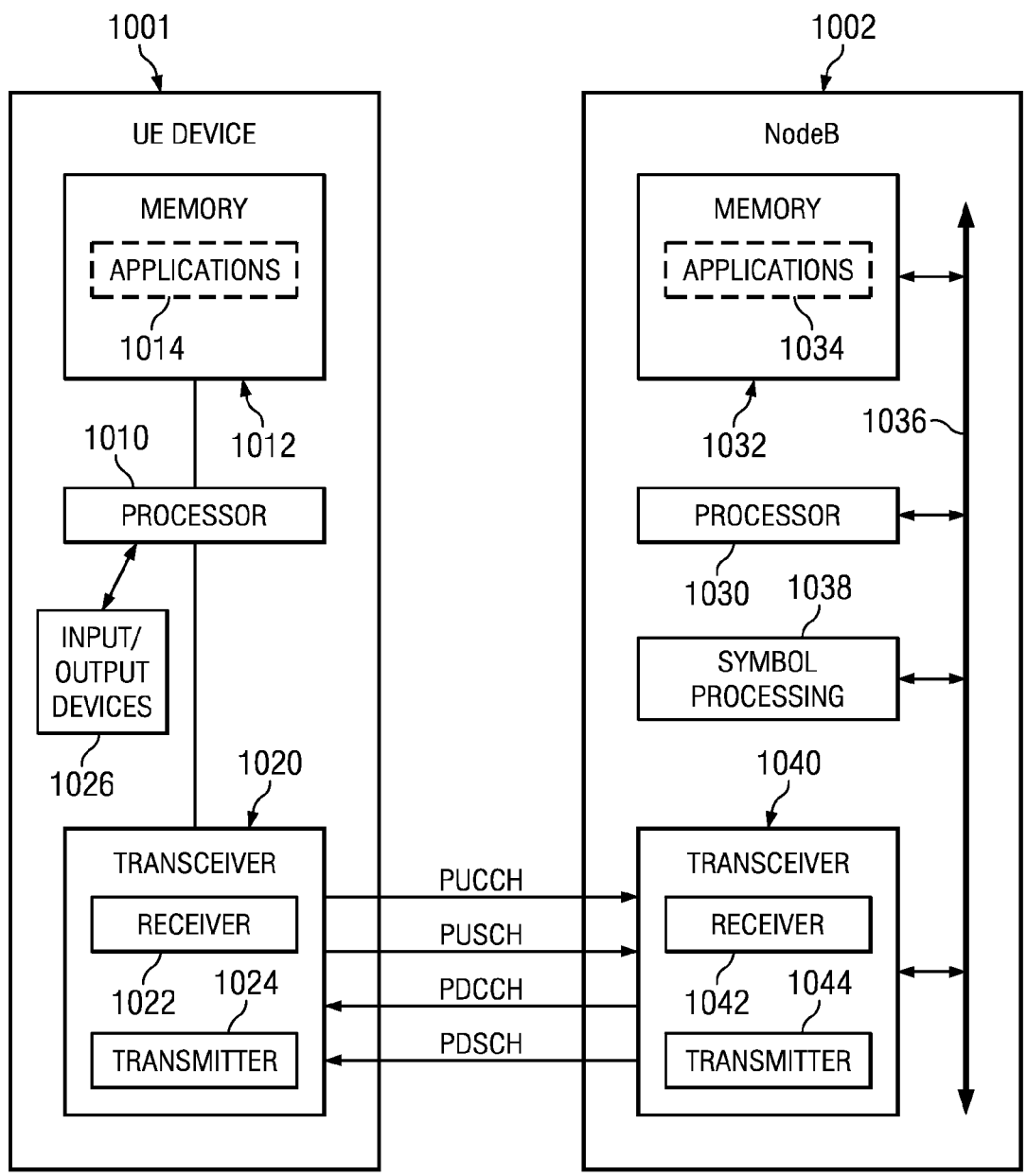
FIG. 7 is a block diagram illustrating internal details of a base station and a mobile user equipment in the network system of FIG. 1 suitable for implementing this invention.

FIG. 7 is a block diagram illustrating internal details of an eNB 1002 and a mobile UE 1001 in the network system of FIG. 1. Mobile UE 1001 may represent any of a variety of devices such as a server, a desktop computer, a laptop computer, a cellular phone, a Personal Digital Assistant (PDA), a smart phone or other electronic devices. In some embodiments, the electronic mobile UE 1001 communicates with eNB 1002 based on a LTE or Evolved Universal Terrestrial Radio Access Network (E-UTRAN) protocol. Alternatively, another communication protocol now known or later developed can be used.

Mobile UE 1001 comprises a processor 1010 coupled to a memory 1012 and a transceiver 1020. The memory 1012 stores (software) applications 1014 for execution by the processor 1010. The applications could comprise any known or future application useful for individuals or organizations. These applications could be categorized as operating systems (OS), device drivers, databases, multimedia tools, presentation tools, Internet browsers, emailers, Voice-Over-Internet Protocol (VOIP) tools, file browsers, firewalls, instant messaging, finance tools, games, word processors or other categories. Regardless of the exact nature of the applications, at least some of the applications may direct the mobile UE 1001 to transmit UL signals to eNB (base station) 1002 periodically or continuously via the transceiver 1020. In at least some embodiments, the mobile UE 1001 identifies a Quality of Service (QoS) requirement when requesting an uplink resource from eNB 1002. In some cases, the QoS requirement may be implicitly derived by eNB 1002 from the type of traffic supported by the mobile UE 1001. As an example, VOIP and gaming applications often involve low-latency uplink (UL) transmissions while High Throughput (HTP)/Hypertext Transmission Protocol (HTTP) traffic can involve high-latency uplink transmissions.

Transceiver 1020 includes uplink logic which may be implemented by execution of instructions that control the operation of the transceiver. Some of these instructions may be stored in memory 1012 and executed when needed by processor 1010. As would be understood by one of skill in the art, the components of the uplink logic may involve the physical (PHY) layer and/or the Media Access Control (MAC) layer of the transceiver 1020. Transceiver 1020 includes one or more receivers 1022 and one or more transmitters 1024.

Processor 1010 may send or receive data to various input/output devices 1026. A subscriber identity module (SIM) card stores and retrieves information used for making calls via the cellular system. A Bluetooth baseband unit may be provided for wireless connection to a microphone and headset for sending and receiving voice data. Processor 1010 may send information to a display unit for interaction with a user of mobile UE 1001 during a call process. The display may also display pictures received from the network, from a local camera, or from other sources such as a Universal Serial Bus (USB) connector. Processor 1010 may also send a video stream to the display that is received from various sources such as the cellular network via RF transceiver 1020 or the camera.

During transmission and reception of voice data or other application data, transmitter 1024 may be or become non-synchronized with its serving eNB. In this case, it sends a random access signal. As part of this procedure, it determines a preferred size for the next data transmission, referred to as a message, by using a power threshold value provided by the serving eNB, as described in more detail above. In this embodiment, the message preferred size determination is embodied by executing instructions stored in memory 1012 by processor 1010. In other embodiments, the message size determination may be embodied by a separate processor/memory unit, by a hardwired state machine, or by other types of control logic, for example.

eNB 1002 comprises a Processor 1030 coupled to a memory 1032, symbol processing circuitry 1038, and a transceiver 1040 via backplane bus 1036. The memory stores applications 1034 for execution by processor 1030. The applications could comprise any known or future application useful for managing wireless communications. At least some of the applications 1034 may direct eNB 1002 to manage transmissions to or from mobile UE 1001.

Transceiver 1040 comprises an uplink Resource Manager, which enables eNB 1002 to selectively allocate uplink Physical Uplink Shared CHannel (PUSCH) resources to mobile UE 1001. As would be understood by one of skill in the art, the components of the uplink resource manager may involve the physical (PHY) layer and/or the Media Access Control (MAC) layer of the transceiver 1040. Transceiver 1040 includes at least one receiver 1042 for receiving transmissions from various UEs within range of eNB 1002 and at least one transmitter 1044 for transmitting data and control information to the various UEs within range of eNB 1002.

The uplink resource manager executes instructions that control the operation of transceiver 1040. Some of these instructions may be located in memory 1032 and executed when needed on processor 1030. The resource manager controls the transmission resources allocated to each UE 1001 served by eNB 1002 and broadcasts control information via the Physical Downlink Control CHannel (PDCCH).

Symbol processing circuitry 1038 performs demodulation using known techniques. Random access signals are demodulated in symbol processing circuitry 1038.

During transmission and reception of voice data or other application data, receiver 1042 may receive a random access signal from a UE 1001. The random access signal is encoded to request a message size that is preferred by UE 1001. UE 1001 determines the preferred message size by using a message threshold provided by eNB 1002. In this embodiment, the message threshold calculation is embodied by executing instructions stored in memory 1032 by processor 1030. In other embodiments, the threshold calculation may be embodied by a separate processor/memory unit, by a hardwired state machine, or by other types of control logic, for example. Alternatively, in some networks the message threshold is a fixed value that may be stored in memory 1032, for example. In response to receiving the message size request, eNB 1002 schedules an appropriate set of resources and notifies UE 1001 with a resource grant.

What is claimed is:

1. A method, comprising:
   receiving multiple channel state information reference symbol (CSI-RS) configurations, the CSI-RS configurations being associated with eNBs having different cell IDs;
   determining a channel state information for each of the channel state information reference symbols (CSI-RS); and
   transmitting in a same response the determined channel state information for each of the channel state information reference symbols (CSI-RS).

2. The method of claim 1, further including:
   receiving communications parameters based on the transmitted determined channel station information for each of the channel state information reference symbols (CSI-RS).

3. The method of claim 2, further including:
   establishing communication with the eNBs using the communication parameters.

4. The method of claim 1, wherein higher layer signaling in one of the eNBs configures the CSI-RS configurations.

5. The method of claim 4, wherein the higher layer signaling indicates a CSI-RS measurement Cell-ID configuration message.

6. The method of claim 5, wherein the Cell-ID configuration message is used to obtain a cell ID for CSI-RS sequence generation.

7. The method of claim 6, wherein the Cell-ID configuration messages is one of the last three Cell-ID configuration message previously used to obtain the cell ID for CSI-RS sequence generation.

8. The method of claim 1, wherein the method is implemented in a user equipment (UE).

9. The method of claim 1, wherein the multiple channel state information reference symbol (CSI-RS) configurations are received from one of the eNBs.

10. The method of claim 9, wherein the determined channel state information for each of the transmission points are transmitted to the eNBs.

11. The method of claim 8, wherein the UE uses cell IDs of all transmission points in the configurations to determine the CSI-RS sequence corresponding to each transmit point.

12. The method of claim 2, wherein received communications parameters are used to determine virtual cell ID for each of the transmission points.

13. The method of claim 12, further including determining a CSI-RS sequence for each of the transmission points using a corresponding indication of virtual cell ID.

14. An apparatus, comprising:
    circuitry for receiving multiple channel state information reference symbol (CSI-RS) configurations, the CSI-RS configurations being associated with eNBs having different cell IDs;
    circuitry for determining a channel state information for each of the channel state information reference symbols (CSI-RS); and
    circuitry for transmitting in a same response the determined channel state information for each of the channel state information reference symbols (CSI-RS).

15. The apparatus of claim 14, further including:
    circuitry for receiving communications parameters based on the transmitted determined channel station information for each of the channel state information reference symbols (CSI-RS).

16. The apparatus of claim 15, further including:
    circuitry for establishing communication with the eNBs using the communication parameters.

17. The apparatus of claim 14, wherein higher layer signaling in one of the eNBs configures the CSI-RS configurations.

18. The apparatus of claim 17, wherein the higher layer signaling indicates a CSI-RS measurement cell-ID configuration message.

19. The apparatus of claim 18, wherein the Cell-ID configuration message is used to obtain a cell ID for CSI-RS sequence generation.

20. The apparatus of claim 19, wherein the scheme is one of the last three schemes previously used to obtain the cell ID for CSI-RS sequence generation.

21. The apparatus of claim 14, wherein the apparatus is a user equipment (UE).

22. The apparatus of claim 14, wherein the multiple channel state information reference symbol (CSI-RS) configurations are received from one of the eNBs.

23. The apparatus of claim 22, wherein the determined channel state information for each of the transmission points are transmitted to the eNBs.

24. The apparatus of claim 21, wherein the apparatus uses cell IDs of all eNBs in the configurations to determine the CSI-RS sequence corresponding to each eNB.

25. The apparatus of claim 15, wherein the received communications parameters are used to determine virtual cell ID for each of the eNBs.

26. The apparatus of claim 25, further including circuitry for determining a CSI-RS sequence for each of the eNBs using a corresponding indication of virtual cell ID.

27. A method, comprising:
    transmitting from an eNB multiple channel state information reference symbol (CSI-RS) configurations, the CSI-RS configurations being associated with eNBs having different cell IDs; and
    receiving in a same response the determined channel state information for each of the multiple channel state information reference symbol (CSI-RS) configurations.

28. The method of claim 27, further including:
    transmitting communications parameters based on the received determined channel station information for each of the eNBs.

29. The method of claim 27, wherein higher layer signaling in one of the eNBs configures the CSI-RS configurations.

30. The method of claim 29, wherein the higher layer signaling indicates a CSI-RS measurement Cell-ID configuration message.

31. The method of claim 30, wherein the Cell-ID configuration message is used to obtain a cell ID for CSI-RS sequence generation.

32. The method of claim 31, wherein the scheme is one of the last three schemes previously used to obtain the cell ID for CSI-RS sequence generation.

33. The method of claim 28, wherein the transmitted communications parameters are used to determine virtual cell ID for each of the eNBs.

34. The method of claim 33, further including determining a CSI-RS sequence for each of the eNBs using a corresponding indication of virtual cell ID.

35. An apparatus, comprising
circuitry for transmitting from an eNB multiple channel state information reference symbol (CSI-RS) configurations, the CSI-RS configurations being associated with eNBs having different cell IDs; and
circuitry for receiving in a same response the determined channel state information for each of the multiple channel state information reference symbol (CSI-RS) configurations.

36. The apparatus of claim 35, further including:
circuitry for transmitting communications parameters based on the transmitted determined channel station information for each of the eNBs.

37. The apparatus of claim 35, wherein higher layer signaling configures the CSI-RS configurations.

38. The apparatus of claim 37, wherein the higher layer signaling indicates a CSI-RS measurement Cell-ED configuration message.

39. The apparatus of claim 38, wherein the Cell-ID configuration message is used to obtain a cell ID for CSI-RS sequence generation.

40. The apparatus of claim 39, wherein the scheme is one of the last three schemes previously used to obtain the cell ID for CSI-RS sequence generation.

41. The apparatus of claim 35, wherein the apparatus is an eNB.

42. The apparatus of claim 36, wherein the transmitted communications parameters are used to determine virtual cell ID for each of the transmission points.

* * * * *